(12) United States Patent
Yamada

(10) Patent No.: US 8,866,664 B2
(45) Date of Patent: Oct. 21, 2014

(54) VEHICLE-MOUNTED RADAR DEVICE

(75) Inventor: Naoyuki Yamada, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 256 days.

(21) Appl. No.: 13/390,804

(22) PCT Filed: Sep. 25, 2009

(86) PCT No.: PCT/JP2009/004862
§ 371 (c)(1),
(2), (4) Date: Feb. 16, 2012

(87) PCT Pub. No.: WO2011/036721
PCT Pub. Date: Mar. 31, 2011

(65) Prior Publication Data
US 2012/0169532 A1    Jul. 5, 2012

(51) Int. Cl.
*G01S 13/00* (2006.01)
*G01S 13/90* (2006.01)
*G01S 13/87* (2006.01)
*G01S 13/93* (2006.01)
*G01S 13/58* (2006.01)

(52) U.S. Cl.
CPC .............. *G01S 13/90* (2013.01); *G01S 13/58* (2013.01); *G01S 13/589* (2013.01); *G01S 13/87* (2013.01); *G01S 13/931* (2013.01)
USPC ........................................................ 342/70

(58) Field of Classification Search
CPC ..... G01S 13/931; G01S 13/589; G01S 13/58; G01S 13/87; G01S 13/90
USPC ........................................................ 342/70
See application file for complete search history.

(56) References Cited

U.S. PATENT DOCUMENTS

RE31,254 E  *  5/1983  Brodeur .................... 342/389
5,057,833 A  * 10/1991  Carlson ..................... 340/961

(Continued)

FOREIGN PATENT DOCUMENTS

DE  102 25 894 A1  2/2004
FR     2 905 765     3/2008

(Continued)

OTHER PUBLICATIONS

International Search Report Issued in PCT/JP09/04862 Filed Sep. 25, 2009.

*Primary Examiner* — Frank J McGue
(74) *Attorney, Agent, or Firm* — Oblon, Spivak, McClelland, Maier & Neustadt, L.L.P.

(57) ABSTRACT

Provided is a vehicle-mounted radar device capable of obtaining a high azimuth resolution with a simple configuration.
The vehicle-mounted radar device is mounted on a vehicle, and includes: a detector for irradiating a periphery of the vehicle with electromagnetic waves, and for outputting a reception signal obtained from reflected waves that are reflected from an object that exists in the periphery of the vehicle; a vehicle information calculator for calculating information related to a movement of the vehicle with a use of vehicle information of the vehicle; a storage unit for storing a plurality of the reception signals outputted by the detector at different time points; and a synthetic aperture processor for conducting a synthetic aperture processing on the reception signals obtained by the vehicle at different positions, based on the information related to the movement of the vehicle.

15 Claims, 12 Drawing Sheets

(56) References Cited

U.S. PATENT DOCUMENTS

| | | | |
|---|---|---|---|
| 6,204,804 B1* | 3/2001 | Andersson | 342/113 |
| 7,639,171 B2* | 12/2009 | Alland et al. | 342/25 R |
| 7,948,439 B2* | 5/2011 | Baughman | 342/463 |
| 8,421,669 B2* | 4/2013 | Sawa | 342/25 R |
| 8,462,043 B2* | 6/2013 | Belcea | 342/159 |
| 2003/0151541 A1* | 8/2003 | Oswald et al. | 342/70 |
| 2005/0012656 A1* | 1/2005 | Reisman et al. | 342/118 |
| 2009/0315777 A1* | 12/2009 | Baughman | 342/457 |
| 2012/0313804 A1* | 12/2012 | Belcea | 342/20 |

FOREIGN PATENT DOCUMENTS

| | | |
|---|---|---|
| JP | 61 201180 | 9/1986 |
| JP | 63 305273 | 12/1988 |
| JP | 9 230039 | 9/1997 |
| JP | 10 206539 | 8/1998 |
| JP | 2001 141812 | 5/2001 |
| JP | 2007 33258 | 2/2007 |
| JP | 2007 199085 | 8/2007 |
| JP | 2009 19952 | 1/2009 |
| JP | 2009 128019 | 6/2009 |
| WO | 2008 029038 | 3/2008 |

\* cited by examiner

F I G. 4
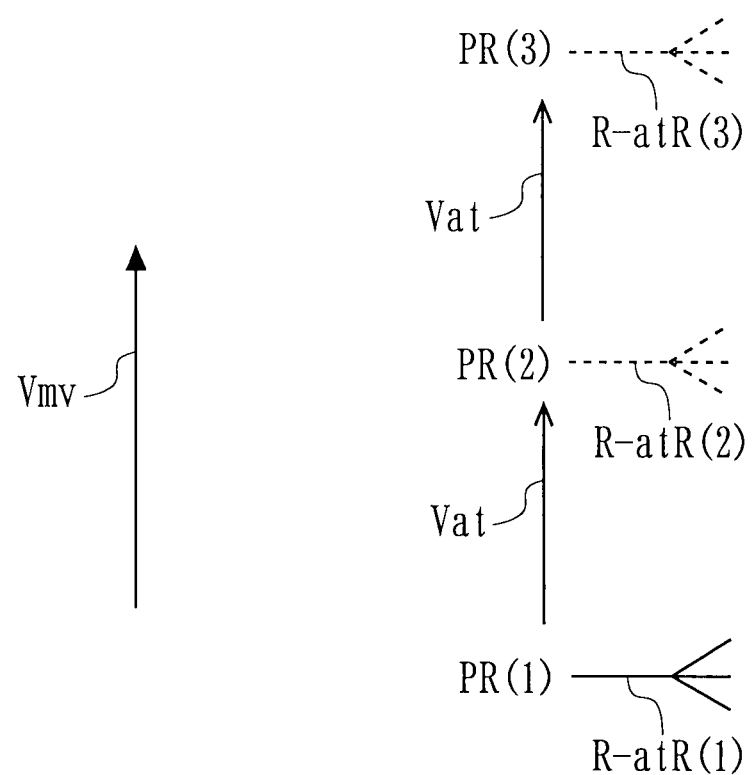

F I G. 8
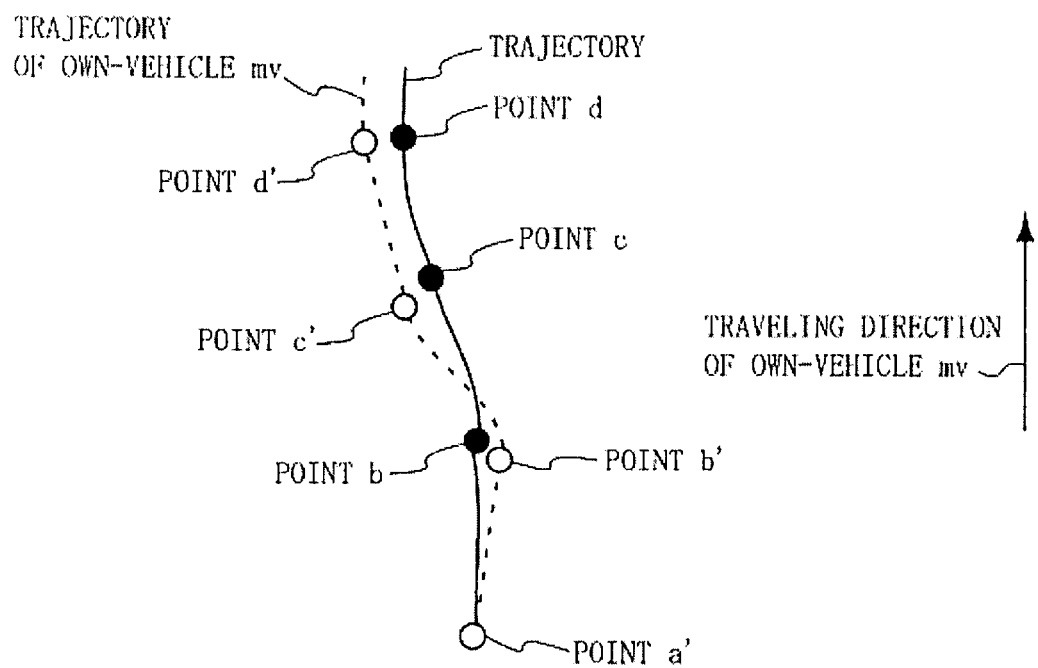

F I G. 1 0
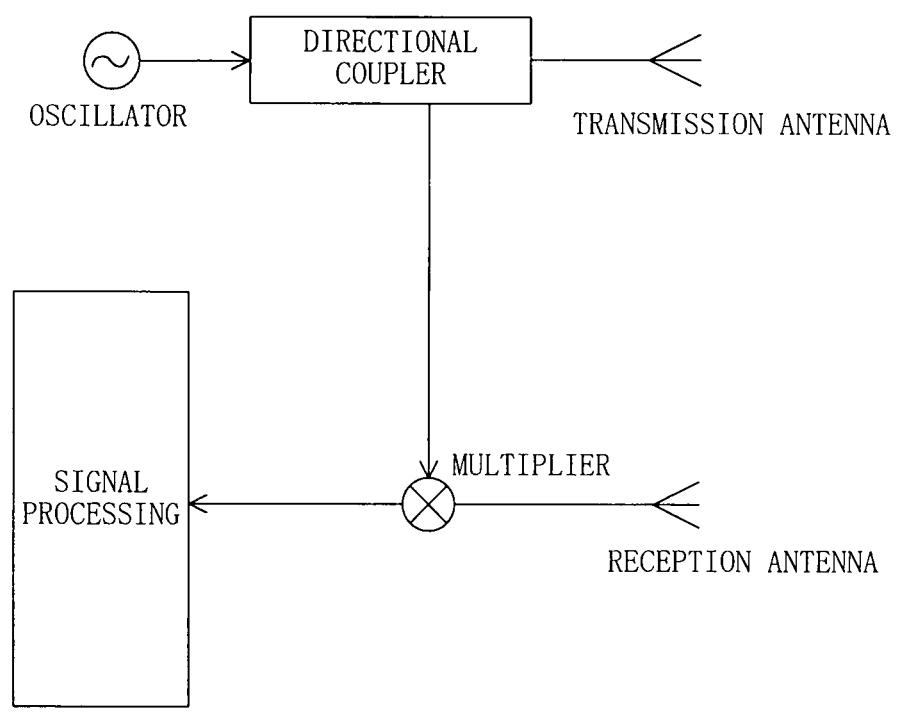

VEHICLE-MOUNTED RADAR DEVICE

TECHNICAL FIELD

The present invention relates to a vehicle-mounted radar device, and more specifically, relates to a vehicle-mounted radar device which is mounted on a vehicle and which detects an object approaching from a periphery of the vehicle.

BACKGROUND ART

Conventionally, as one that detects an object that is approaching from the front or a side of a vehicle of one's own, a vehicle-mounted object detecting device which is mounted on the own-vehicle is known. Specifically, the vehicle-mounted object detecting device detects an object approaching the own-vehicle by means of a radar device (for example, a millimeter wave radar device). Then, based on the detection result, the vehicle-mounted object detecting device determines the risk of a collision between the own-vehicle and the object. In addition, in a case where it is determined that there is a risk of a collision between the own-vehicle and the object, or in other cases, the vehicle-mounted object detecting device controls various devices built into the own-vehicle.

Meanwhile, for an object that exists in the front or a side of the own-vehicle, it is required for the radar device included in the vehicle-mounted object detecting device to accurately acquire information regarding position, azimuth, velocity and the like of the object with regard to the own-vehicle, and to precisely understand the positional relationship between the own-vehicle and the object. Although a radar device included in a general vehicle-mounted object detecting device may recognize an existence of an object, it is often impossible to precisely distinguish the size of the object (for example, a vehicle width of another vehicle). One of such reasons is an inability to enlarge an aperture area of an antenna in the radar device; since, in a case with a radar device that uses radio waves, a resolution of an angle direction is proportional to an aperture area of the antenna. More specifically, since the radar device included in the vehicle-mounted object detecting device is envisioned to be mounted on a vehicle, there are restrictions for the size of the radar device, and the aperture area of the antenna cannot be enlarged.

In addition, generally, in the vehicle-mounted object detecting device, in order to enhance the resolution of the radar device applied in the vehicle-mounted object detecting device, a method is used in which a plurality of reception antenna elements are disposed in the radar device. Additionally, generally, the current situation for the vehicle-mounted object detecting device is that a signal processing method with a high processing load such as DBF (Digital Beam Forming) and MUSIC (MUltiple SIgnal Classification) are applied on signals received from reception antennae in order to compensate for the insufficient resolution. However, on the other hand, for example, a technology disclosed in patent literature 1 is a technology that achieves a radar as if it has an antenna having a large aperture area even with a radar device including a small number of antenna elements.

CITATION LIST

Patent Literature

[PTL 1] Japanese Laid-Open Patent Publication No. S61-201180

SUMMARY OF THE INVENTION

Problems to be Solved by the Invention

The technology disclosed in the above described patent literature 1 is one that extracts a target on the ground by conducting an aperture synthesis for reflected waves obtained from a radar device mounted on a movable platform such as an aircraft, an artificial satellite, or the like.

However, since the technology disclosed in the above described patent literature 1 envisions mounting the radar device on an aircraft, an artificial satellite, or the like, the technology cannot be directly adapted for a vehicle. Furthermore, the technology disclosed in the above described patent literature 1 is one that reproduces a stationary target on the ground as an image data by processing signals obtained from the radar device. Therefore, there is also a problem where complicated processes become necessary and the processing load becomes large.

The present invention has been made in view of the above described situation, and its objective is to provide a vehicle-mounted radar device capable of obtaining a high azimuth resolution with a simple configuration.

Solution to the Problems

In order to solve the problem described above, the present invention includes the features shown in the following.

A vehicle-mounted radar device mounted on a vehicle, comprises: a detector for irradiating a periphery of the vehicle with electromagnetic waves, and for outputting a reception signal obtained from reflected waves that are reflected from an object that exists in the periphery of the vehicle; a vehicle information calculator for calculating information related to a movement of the vehicle with a use of vehicle information of the vehicle; a storage unit for storing a plurality of the reception signals outputted by the detector at different time points; and a synthetic aperture processor for conducting a synthetic aperture processing on the reception signals obtained by the vehicle at different positions, based on the information related to the movement of the vehicle.

In a second aspect of the present invention based on the first aspect, the vehicle information calculator calculates, with a use of the vehicle information of the vehicle, information indicating positions where the reception signals are respectively obtained, as the information related to the movement of the vehicle; the storage unit stores the reception signal together with the information indicating the positions where the reception signals are obtained; and the synthetic aperture processor conducts the synthetic aperture processing on the reception signals, based on the positions where the reception signals are obtained.

In a third aspect of the present invention based on the second aspect, the vehicle information calculator further calculates a time interval of the obtained reception signals, based on time information obtained for the reception signals, and the synthetic aperture processor conducts the synthetic aperture processing on the reception signals, based on the positions where the reception signal are obtained and on the obtained time interval of the reception signals.

In a fourth aspect of the present invention based on the first or the third aspect: the vehicle information calculator further calculates, with a use of the vehicle information of the vehicle, information indicating vehicle's directions in which the reception signals are respectively obtained; the storage unit stores the reception signals together with the information indicating the vehicle's directions in which the reception signals are obtained; and the synthetic aperture processor conducts the synthetic aperture processing on the reception signals, based on positions where the reception signals are obtained and on directions to which the electromagnetic waves are radiated and which are obtained from the vehicle's directions in which the reception signals are obtained.

In a fifth aspect of the present invention based on the first aspect: the vehicle information calculator calculates, with a use of the vehicle information of the vehicle, information indicating a trajectory in which the vehicle has moved, as the information related to the movement of the vehicle; the storage unit stores, as a first trajectory, the information indicating the trajectory in which the vehicle has moved, together with the reception signals; and the synthetic aperture processor calculates a second trajectory from the first trajectory and the reception signals, and conducts the synthetic aperture processing on the reception signals under an assumption that the reception signals are respectively obtained at different positions on the second trajectory.

In a sixth aspect of the present invention based on the first aspect, the synthetic aperture processor conducts the synthetic aperture processing by using only a predetermined number of the reception signals stored in the storage unit.

In a seventh aspect of the present invention based on the first aspect, the synthetic aperture processor, in accordance with a predetermined condition, increases or decreases the number of the reception signals used in the synthetic aperture processing.

In an eighth aspect of the present invention based on the first aspect, the synthetic aperture processor, by conducting the synthetic aperture processing, further conducts a process that detects the object in the periphery of the vehicle.

In a ninth aspect of the present invention based on the first aspect, the detector is mounted on at least one a front and a back of the vehicle.

In a tenth aspect of the present invention, the eighth aspect further comprises a determination unit for determining a risk of a contact between the vehicle and an object detected by the synthetic aperture processor.

Advantageous Effects of the Invention

With the first aspect, even when the aperture area of an antenna cannot be enlarged (due to restrictions on the size of those to be mounted), since a synthetic aperture processing is conducted on the reception signals obtained from the radar device by utilizing the movement of the vehicle, properties equivalent to that obtained if receptions are conducted with a radar device having a large aperture area can be achieved. Therefore, with a simple configuration, a vehicle-mounted radar device capable of obtaining a high azimuth resolution can be provided.

With the second aspect, since information indicating the reception signals and the positions of the vehicle are stored in the storage unit as a set, the synthetic aperture processing can be conducted easily.

With the third aspect, since the time interval of the obtained reception signals can be taken into consideration in the synthetic aperture processing, the synthetic aperture processor can conduct the synthetic aperture processing on the reception signals in a further precise manner.

With the fourth aspect, even when the direction of the vehicle changes, the synthetic aperture processing can be conducted on the reception signals in a further precise manner.

With the fifth aspect, even when, for example, the movement of the vehicle becomes complicated due to a steering operation performed by a driver, the synthetic aperture processing can be conducted on the reception signals in a further precise manner.

With the sixth aspect, a synthetic aperture processing envisioned for targets that are desired to be separately detected can be achieved. Thus, for example, when envisioned is a situation requiring a higher azimuth resolution such as when parking a vehicle in a vacant space of a parking area, a larger number can be set in advance for the reception signals used in the synthetic aperture processing.

With the seventh aspect, for example, when a theoretical resolution is not obtained, the number of the reception signals used in the synthetic aperture processing can be increased.

With the eighth aspect, since a process for detecting the object in the periphery of the vehicle is conducted by conducting the synthetic aperture processing, for example, a plurality of objects existing in the periphery of the vehicle can be separately detected.

With the ninth aspect, since the detector is mounted on at least one of the front and the back of the vehicle, for example, when parking the vehicle in a vacant space in a parking area, a plurality of objects existing in the periphery of the vehicle can be separately detected, and parking of the vehicle can be conducted safely.

With the tenth aspect, since the synthetic aperture processor determines a risk of a contact between the detected object and the vehicle, for example, a safety measure such as calling for attention can be taken against the driver of the vehicle.

BRIEF DESCRIPTION OF THE DRAWINGS

FIG. 4 is a figure for describing the movement of a reception antenna of a radar mounted on a movable body.

FIG. 8 is a figure showing one example of a trajectory of the own-vehicle mv.

FIG. 10 is a figure showing one example of a configuration of a radar device having a single reception system.

DESCRIPTION OF EMBODIMENTS

With reference to the following drawings, a vehicle-mounted radar device according to one embodiment of the present invention will be described. It should be noted that, in the present embodiment, description is provided envisioning a case in which a Driver Support System (DSS) including the vehicle-mounted radar device is mounted on a vehicle (in the following, referred to as an own-vehicle mv).

First, a general outline of the vehicle-mounted radar device according to the present embodiment will be briefly described.

Figure 1:
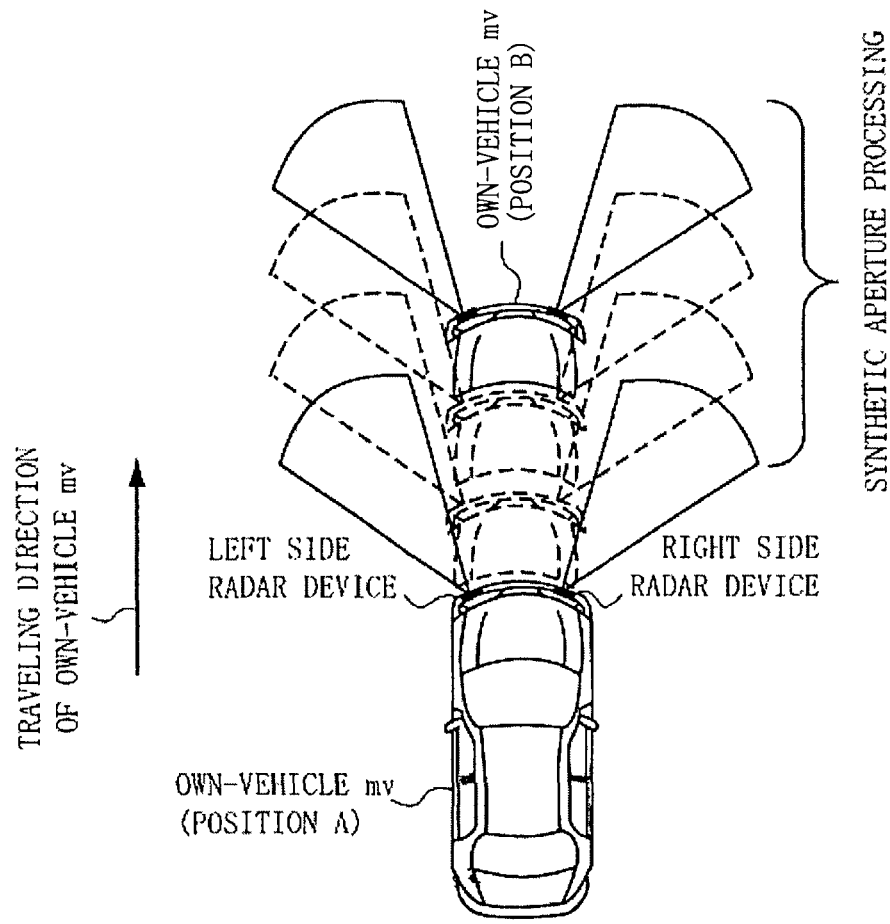
FIG. 1 is a figure showing a movement of an own-vehicle mv and movements of radar devices mounted on the own-vehicle mv.

With regard to a radar device mounted on the own-vehicle mv, the radar device moves as the own-vehicle mv moves (travels). FIG. 1 is a figure showing a movement of the own-vehicle mv and movements of radar devices mounted on the own-vehicle mv. It should be noted that, in FIG. 1, the radar devices are mounted on the right and left front portions of the own-vehicle mv as one example (a right side radar device and a left side radar device shown in FIG. 1).

For example, as shown in FIG. 1, envisioned here is a case in which the own-vehicle mv supposedly travels in a direction of an arrow (a traveling direction of the own-vehicle mv) shown in FIG. 1 from position A to position B. During this moment, while the own-vehicle mv is moving from position A to position B, for example, if a plurality of reception signals obtained from the right side radar device are synthesized (synthetic aperture processing), properties equivalent to that obtained if receptions are conducted with a right side radar device having a large aperture area (antenna) can be achieved. For example, specifically, the vehicle-mounted radar device according to the present embodiment stores a plurality of reception signals outputted by the right side radar device at different time points; and, based on information related to the movement of the own-vehicle mv, conducts a synthetic aperture processing on the reception signals respectively obtained by the own-vehicle mv at different positions.

Therefore, the vehicle-mounted radar device according to the present embodiment is made with a focus on the fact that positions and directions of the radar devices (antennae) mounted on the own-vehicle mv change associated with a movement (travel) of the own-vehicle mv. More specifically, by performing a synthetic aperture processing on the plurality of reception signals obtained from the radar device while moving along a certain interval (for example, an interval from position A to position B, as shown in FIG. 1), the vehicle-mounted radar device according to the present embodiment can enhance the resolution in the azimuth direction of the radar devices.

It should be noted that, although the details will be described in the following, the information related to the movement of the own-vehicle mv may refer to information indicating positions where the reception signals are obtained, or may refer to a moving distance at all positions where the reception signals are obtained. Furthermore, the vehicle-mounted radar device according to the present embodiment may perform the synthetic aperture processing on the plurality of reception signals, based on time information obtained for the reception signals and information indicating directions of the own-vehicle mv (thus, the directions of the antennae).

Figure 2:
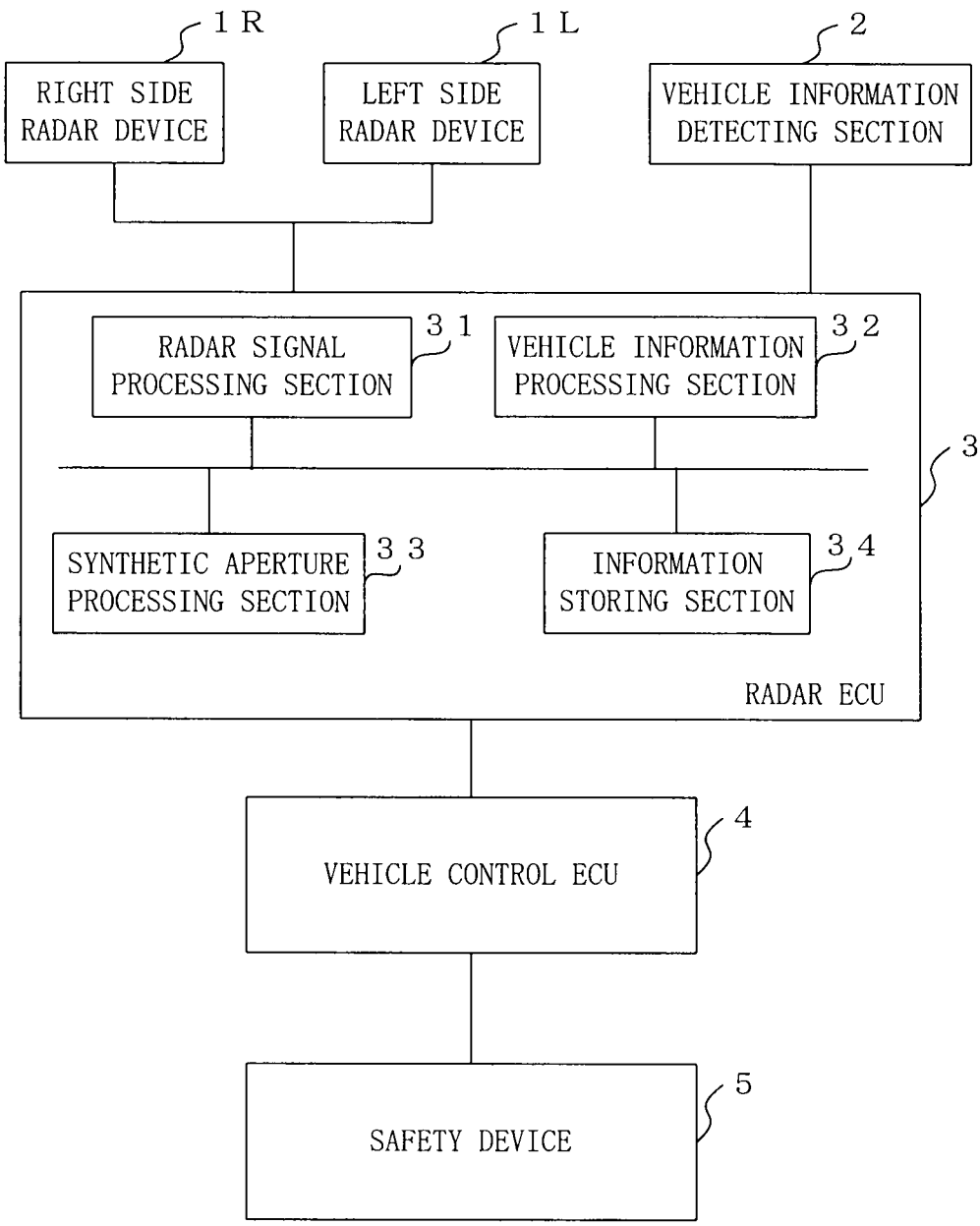
FIG. 2 is a figure showing one example of forward mount positions of radar devices 1.

FIG. 2 is a block diagram showing one example of a configuration of a driver support system including the vehicle-mounted radar device according to the present embodiment. As shown in FIG. 2, the driver support system includes a right side radar device 1R, a left side radar device 1L, a vehicle information detecting section 2, a radar ECU (Electrical Control Unit) 3, a vehicle control ECU 4, and a safety device 5.

Figure 3:
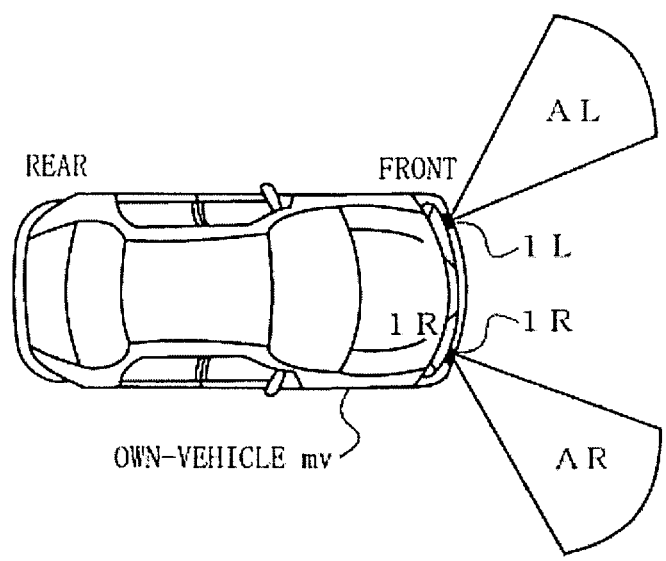
FIG. 3 is a block diagram showing one example of a configuration of a driver support system including a vehicle-mounted radar device according to one embodiment.

The right side radar device 1R includes a reception antenna R-atR and a transmission antenna T-atR (not shown) within the right side radar device 1R. In addition, the right side radar device 1R is installed in a predetermined position of the own-vehicle mv (for example, a position where a head light, a directional indicator, and the like on the right front portion of the own-vehicle mv are mounted), and monitors the forward periphery of the own-vehicle mv by radiating electromagnetic waves directed toward the outside the own-vehicle mv. For example, as shown in FIG. 3, the right side radar device 1R radiates the electromagnetic waves directed toward a diagonal forward right of the own-vehicle mv, and detects a target (for example, other vehicles, bicycles, pedestrians, buildings, and the like) existing within a detection range (AR in FIG. 3) of the right side radar device 1R.

The left side radar device 1L includes a reception antenna R-atL and a transmission antenna T-atL (not shown) in the left side radar device 1L. In addition, the left side radar device 1L is installed in a predetermined position of the own-vehicle mv (for example, a position where a head light, a directional indicator, and the like on the left front portion of the own-vehicle mv are mounted), and monitors the forward periphery of the own-vehicle mv by radiating electromagnetic waves directed toward the outside of the own-vehicle mv. For example, as shown in FIG. 3, the left side radar device 1L radiates the electromagnetic waves directed toward a diagonal forward left of the own-vehicle mv, and detects a target (for example, other vehicles, bicycles, pedestrians, buildings, and the like) existing within a detection range (AL in FIG. 3) of the left side radar device 1L.

It should be noted that, in the following descriptions, except for when the right side radar device 1R and the left side radar device 1L are particularly distinguished, the right side radar device 1R and the left side radar device 1L are referred simple as radar devices 1 as a general term.

The vehicle information detecting section 2 detects vehicle information of the own-vehicle mv. Specifically, the vehicle information detecting section 2 acquires vehicle information from various sensors and the like such as a velocity sensor which detects a velocity of the own-vehicle mv, a travel distance sensor which detects a moving distance of the own-vehicle mv, a yaw rate sensor which detects a yaw rate of the own-vehicle mv, a lateral acceleration sensor (for example, three axis G-sensor) which detects a vehicle width-direction acceleration acting on the center-of-gravity position of the own-vehicle mv, a steering angle sensor which detects a steering angle of the own-vehicle mv, a roll sensor, a pitch sensor, and a clock which informs the current time. It should be noted that, the information (specifically, a vehicle speed, a moving distance, a yaw rate, a lateral acceleration, and a steering angle of the own-vehicle mv, current time, and the like) outputted from the various sensors are referred to as vehicle information imv.

The radar ECU 3 is an information processing device that includes a radar signal processing section 31, a vehicle information processing section 32, a synthetic aperture processing section 33, an information storing section 34, an interface circuit, and the like.

The radar signal processing section 31 acquires a reception signal SR from the right side radar device 1R. Similarly, the radar signal processing section 31 acquires a reception signal SL from the left side radar device 1L. It should be noted that, the radar devices 1 and the radar signal processing section 31 correspond to one example of a detector described in the claims.

The vehicle information processing section 32 detects movements of the radar devices 1, based on the vehicle information imv outputted from the vehicle information detecting section 2. It should be noted that, the vehicle information processing section 32 corresponds to one example of vehicle information processor described in the claims.

Here, a process conducted by the vehicle information processing section 32 will be briefly described by using FIG. 4.

FIG. 4 is a figure for describing the movement of a reception antenna of a radar device mounted on a movable body (for example, the own-vehicle mv). Generally, the radar device radiates electromagnetic waves from a transmission antenna included in the radar, and receives reflected waves with a reception antenna. Furthermore, when the radar device is mounted on the movable body (for example, the own-vehicle mv), the reception antenna of the radar will move associated with the movement of the movable body.

It should be noted that, the following descriptions are provided assuming that the reception antenna shown in FIG. 4 is the reception antenna R-atR of the right side radar device 1R mounted on the own-vehicle mv, and that the number of the reception antenna R-atR and the number of the transmission antenna T-atR included in the right side radar device 1R are respectively one. Furthermore, the following descriptions are provided assuming that the own-vehicle mv is moving straight ahead in a direction of an arrow Vmv in FIG. 4.

As shown in FIG. 4, for example, the reception antenna R-atR is at a certain position (for example, a position PR(1) of the reception antenna R-atR(1) in FIG. 4) at a certain time. Meanwhile, since the right side radar device 1R is mounted on the own-vehicle mv, the reception antenna R-atR(1) also moves in an arrow direction VatR in FIG. 4, associated with the movement of the own-vehicle mv in a moving direction of the own-vehicle mv (the arrow Vmv in FIG. 4). Thus, as shown in FIG. 4, the reception antenna R-atR(1) at a certain position moves so as to become the reception antenna R-atR(2), and the reception antenna R-atR(3), associated with the movement (travel) of the own-vehicle mv. In other words, the reception antenna R-atR(1) at a certain position changes its position to the reception antenna R-atR(2), and to the reception antenna R-atR(3) as time passes.

Then, the vehicle information processing section 32 calculates the position of the reception antenna R-atR based on the vehicle information imv outputted from the vehicle information detecting section 2. For example, the vehicle information processing section 32 calculates the position PR(1) of the reception antenna R-atR(1), a position PR(2) of the reception antenna R-atR(2), a position PR(3) of the reception antenna R-atR(3), based on the vehicle information imv outputted from the vehicle information detecting section 2.

Described more specifically in the following is one example of a process conducted by the vehicle information processing section 32. For example, when the position PR(1) of the reception antenna R-atR(1) is defined as a basis, the vehicle information processing section 32 can calculate the position PR(2) of the reception antenna R-atR(2), and the position PR(3) of the reception antenna R-atR(3) from the moving distance and the like of the own-vehicle mv, which are included in the vehicle information imv. More specifically, based on the vehicle information imv, the vehicle information processing section 32 can calculate distances to the reception antenna R-atR(2) and the reception antenna R-atR(3) by using the reception antenna R-atR(1) at a certain position as a basis. In other words, the vehicle information processing section 32 can calculate a movement amount of the reception antenna R-atR(1) (a change in the position of the reception antenna R-atR(1) associated with the movement of the own-vehicle mv).

Returning to the description of FIG. 3, as shown in FIG. 3, the synthetic aperture processing section 33 conducts the synthetic aperture processing based on information stored in the information storing section 34 which is described later. Details of the synthetic aperture processing conducted by the synthetic aperture processing section 33 will be described later. Furthermore, the synthetic aperture processing section 33 corresponds to one example of a synthetic aperture processor described in the claims.

The information storing section 34 temporarily stores the reception signal SR acquired by the right side radar device 1R from the radar signal processing section 31. In addition, the information storing section 34 temporarily stores a position PR of the right side radar device 1R (thus, the position PR of the reception antenna R-atR) when the radar signal processing section 31 acquires the reception signal SR from the right side radar device 1R. It should be noted that, at this moment, the information storing section 34 temporarily stores the reception signal SR in association with the position PR of the right side radar device 1R obtained when the reception signal SR is acquired. Furthermore, the information storing section 34 corresponds to one example of a storage unit described in the claims.

The right side radar device 1R is used as an example in the following specific description with reference to the above described FIG. 4. For example, the position of the reception antenna R-atR(1) is defined as the position PR(1), and the reception signal SR received by the reception antenna R-atR(1) at the position PR(1) is configured as the reception signal SR(1). In this manner, the position PR(1) and the reception signal SR(1) are temporarily stored in the information storing section 34 in association with one another. Similarly, for example, the position of the reception antenna R-atR(2) is defined as the position PR(2), and the reception signal SR received by the reception antenna R-atR(2) at the position PR(2) is configured as the reception signal SR(2). Therefore, by temporarily storing, in the information storing section 34, the position PR of the reception signal SR in a chronological order in association with one another, it can be understood that the reception signal SR received by the right side radar device 1R (thus, the reception antenna R-atR) at a position PR(k) is a reception signal SR(k) (k=1, 2, 3, ... K).

Returning to the description of FIG. 3, as shown in FIG. 3, the vehicle control ECU 4 determines whether or not there is a risk of a collision (contact) between the own-vehicle mv and a target, based on information (specifically, a distance from the own-vehicle mv to the target, a direction in which the target exists relative to the own-vehicle mv, and a relative velocity of the target) outputted from the radar ECU 3. Then, when the vehicle control ECU 4 determines that there is a risk of a collision (contact) between the own-vehicle mv and the target, it instructs the safety device 5 to take safety measures described later.

In accordance with the instruction from the vehicle control ECU 4, the safety device 5 calls the driver of the own-vehicle mv for attention when the risk of a collision with the target is high. In addition, the safety device 5 also includes various devices for protecting crew members and for alleviating the condition of the collision, in order to lessen injuries to crew members of the own-vehicle mv in case the collision with the target cannot be avoided. In the following, operations conducted by the safety device 5, namely, calling the driver for attention, collision risk avoidance operations, collision damage lessening operations, and the like are collectively referred to as safety measures.

Next, referring to FIG. 5, one example of the operations conducted by sections of the radar ECU 3 of the vehicle-mounted radar device according to the present embodiment will be described. It should be noted that, described in the following is an example of an envisioned case in which the radar signal processing section 31 acquires the reception signal SR from the right side radar device 1R, and the sections of the radar ECU 3 conduct the synthetic aperture processing by using the reception signal SR. Furthermore, as described above, in order to simplify the description, the following description envisions a case where a single reception antenna is included in the right side radar device 1R.

Figure 5:
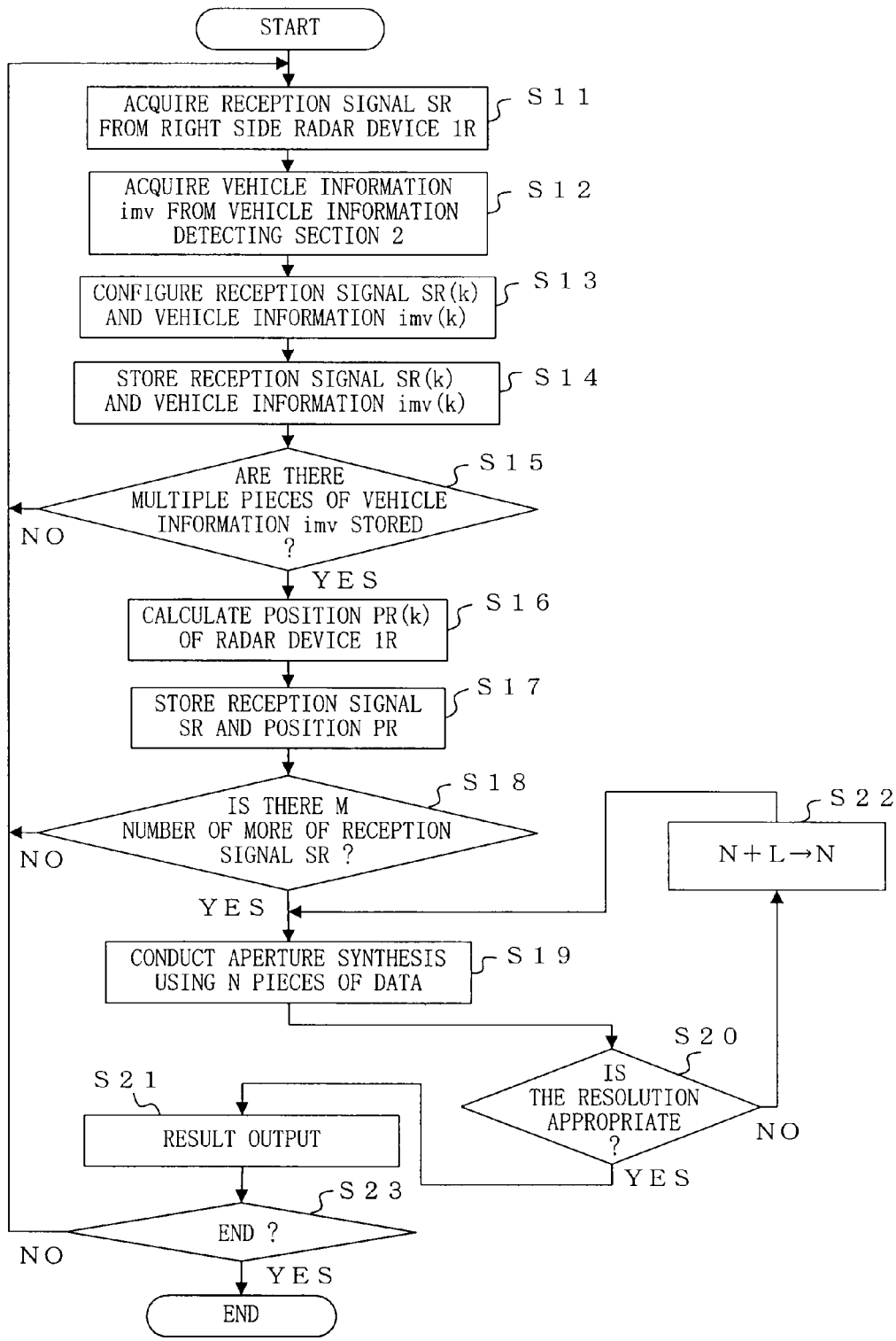
FIG. 5 is a flowchart showing one example of processes conducted in sections of a radar ECU2 of the vehicle-mounted radar device according to one embodiment.

FIG. 5 is a flowchart showing one example of the processes conducted by the sections of the radar ECU 3 of the vehicle-mounted radar device according to the present embodiment. It should be noted that, the processes in the flowchart shown in FIG. 5 are conducted by having the radar ECU 3 execute a predetermined program included in the radar ECU 3. Furthermore, the program for executing the processes shown in FIG. 5 is, for example, stored in a storage area of the radar ECU 3 in advance. Furthermore, when the power of the radar ECU 3 is turned ON (for example, when an ignition switch of the own-vehicle mv is turned ON, or the like), the processes in the flowchart shown in FIG. 5 are executed by the radar ECU 3.

At step S11 in FIG. 5, the radar signal processing section 31 acquires the reception signal SR from the right side radar device 1R, outputs the reception signal SR to the vehicle information processing section 32, and advances the process to step S12 which is next.

At step S12, the vehicle information processing section 32 acquires the vehicle information imv outputted from the vehicle information detecting section 2, and advances the process to step S13 which is next.

At step S13, the vehicle information processing section 32 configures the reception signal SR(k) and vehicle information imv(k) (k=1, 2, 3, ... K). Specifically, for example, when the processes in the flowchart are initiated and when the sections of the radar ECU 3 acquire the reception signal SR and the vehicle information imv for the first time, the vehicle information processing section 32 configures the vehicle information imv acquired from the vehicle information detecting section 2 as vehicle information imv(1). Then, simultaneously, the vehicle information processing section 32 configures the reception signal SR outputted from the radar signal processing section 31 as the reception signal SR(1). Similarly, for example, processes in the flowchart are repeated, and when the sections of the radar ECU 3 acquire the reception signal SR and the vehicle information imv again, the vehicle information processing section 32 configures the vehicle information imv and the reception signal SR as vehicle information imv(2) and the reception signal SR(2), respectively. Then, after the process at this step, the vehicle information processing section 32 advances the process to step S14 which is next.

At step S14, the information storing section 34 temporarily stores the vehicle information imv(k) and the reception signal SR(k) outputted from the vehicle information processing section 32 at the above described step S13. For example, by having the processes in the flowchart initiated, the vehicle information imv(1) and the reception signal SR(1) are stored in the information storing section 34, and by having the processes in the flowchart repeated, the vehicle information imv(2) and the reception signal SR(2) are stored in the information storing section 34. In this manner, associations can be formed for the vehicle information imv which is obtained when the radar signal processing section 31 acquires the reception signal SR from the right side radar device 1 R. Then, the information storing section 34 advances the process to step S15 which is next.

At step S15, the vehicle information processing section 32 determines whether or not multiple pieces of vehicle information imv are stored. As described above, as a result of repeating the processes in the flowchart, in the information storing section 34, the reception signal SR(1), the reception signal (2), the reception signal (3), and so on, are respectively stored in association with the vehicle information imv(1), the vehicle information imv(2), vehicle information imv(3), and so on. Although it will be obvious from the description below, at the next step S16, it is necessary to have multiple pieces of the vehicle information imv in order to calculate the position PR of the right side radar device 1R (thus, the reception antenna R-atR). It should be noted that, for example, when only the vehicle information imv(1) is stored in the information storing section 34, in the process at the present step, the vehicle information processing section 32 makes a negative determination (NO), and returns the process to step S11. On the other hand, for example, when the vehicle information imv(1) and the vehicle information imv(2) are stored in the information storing section 34, in the process at the present step, the vehicle information processing section 32 makes a positive determination (YES), and advances the process to step S16 which is next.

It should be noted that, even when multiple pieces of the vehicle information imv are stored in the information storing section 34, if the vehicle information processing section 32 determines that the own-vehicle mv has not been moved as a result of referring to the multiple pieces of the vehicle information imv, a negative determination may be made in the process at step S15. Then, the multiple pieces of the vehicle information imv and the reception signals SR corresponding to the multiple pieces of the vehicle information imv may be erased from the information storing section 34. Furthermore, when the multiple pieces of the vehicle information imv are stored in the information storing section 34, as a result of referring to the multiple pieces of the vehicle information imv, if multiple pieces of vehicle information imv indicated to be at an identical time point and multiple reception signals SR corresponding to the multiple pieces of the vehicle information imv are stored, the vehicle information processing section 32 may erase the overlapping vehicle information imv and reception signals SR corresponding to the vehicle information imv, and may advance the process to step S16. Specifically, for example, when vehicle information imv(5) and a reception signal SR(5) corresponding to the vehicle information imv(5), and vehicle information imv(6) and a reception signal SR(6) corresponding to the vehicle information imv(6) are stored in the information storing section 34; as a result of referring to the vehicle information imv(5) and the vehicle information imv(6), if the vehicle information processing section 32 determines that the own-vehicle mv has not been moving from the time the vehicle information imv(5) has been obtained to the time the vehicle information imv(6) has been obtained, the vehicle information processing section 32 may erase the vehicle information imv(5) or the vehicle information imv(6).

At step S16, which is the process subsequent to step S15 where a positive determination is made (YES), the vehicle information processing section 32 calculates the position PR(k) of the right side radar device 1R (thus, the reception antenna R-atR).

In the following, the process conducted by the vehicle information processing section 32 at the present step will be described with reference to FIG. 4 again. For example, in FIG. 4, envisioned is a case where the processes in the flowchart are initiated, and the radar signal processing section 31 acquires the reception signal SR (thus, the reception signal SR(1)) for the first time from the right side radar device 1R (thus, the reception antenna R-atR(1)). It should be noted that, the position of the reception antenna R-atR(1) is defined here as the position PR(1). Furthermore, envisioned here is a case where the own-vehicle mv has moved, and then, the radar signal processing section 31 acquires the reception signal SR (thus, the reception signal SR(2)) from the right side radar device 1R (thus, the reception antenna R-atR(2)). Similarly, the position of the reception antenna R-atR(2) at this point is defined as the position PR(2).

The vehicle information processing section 32 calculates the position PR(k) of the right side radar device 1R at step S16, and in the example described above, calculates the position PR(1) of the reception antenna R-atR(1). For example, one example of the process at the present step S16 is as follows: the processes in the flowchart are initiated, and the position PR(1) of the reception antenna R-atR(1) is calculated by using, as a basis, the position PR(1) of the right side radar device 1R at the time when the radar signal processing section 31 receives the reception signal SR (thus, the reception signal SR(1)) for the first time from the right side radar device 1R (thus, the reception antenna R-atR(1)). In this case, the position PR(1) of the reception antenna R-atR(1) becomes the position PR(1) (0, 0). Then, the vehicle information processing section 32 refers to the vehicle information imv(1) and the vehicle information imv(2), and calculates the position PR(2) of the reception antenna R-atR(2) in a coordinate system (x, y) having the position PR(1) of the reception antenna R-atR(1) as a point of origin (0, 0). Furthermore, the position PR of the reception antenna R-atR may be calculated as a position PR in a coordinate system (x, y) having an arbitrary point as a point of origin. In such manners, by calculating each position PR of the reception antenna R-atR, the position where the reception antenna R-atR exists at a certain time point can be known. It should be noted that, when the vehicle information processing section 32 determines that the own-vehicle mv is traveling straight ahead (for example, as described using FIG. 4) as a result of referring to the vehicle information imv, each position of the position PR of the reception antenna R-atR may be calculated from the moving distance of the reception antenna R-atR. Therefore, when the own-vehicle mv is traveling straight ahead, the vehicle information processing section 32 may calculate the position PR by using, for example, the moving distance included in the vehicle information imv.

Returning to the description of the flowchart in FIG. 5, the information storing section 34 temporarily stores the reception signal SR and the position PR (or information representing thereof) in association with one another, at step S17 in FIG. 5. Specifically, the information storing section 34 stores, as a set, the reception signal SR(k), and the position PR(k) of the right side radar device 1R where the radar signal processing section 31 acquires the reception signal SR(k) from the right side radar device 1R. Describing more specifically, for example, the position PR of the right side radar device 1R when the radar signal processing section 31 acquires the right side radar device 1R from the reception signal SR(2) is stored in the information storing section 34 as the position PR(2). In addition, as described above, when the own-vehicle mv is traveling straight ahead, the information storing section 34 may store a moving distance Δd of the reception antenna R-atR from the time when a reception signal (k) is acquired to the time when a reception signal (k+1) is acquired. More specifically, the information storing section 34 may, for example, store the moving distance Δd21 of the reception antenna R-atR from the time when the reception signal (1) is acquired to the time when the reception signal (2) is acquired by the radar signal processing section 31. It should be noted that, when storing the reception signal SR, the position PR, and the moving distance Ad in the information storing section 34; the information storing section 34 may also store a time interval at which the radar signal processing section 31 acquires the reception signal SR(k) from the right side radar device 1R.

As described above, by having the sections of the radar ECU 3 conduct the processes of the above described step S11 to step S17, the reception signal SR(k) can be stored in association with the position PR(k) of the radar devices 1R where the radar signal processing section 31 acquires the reception signal SR(k) from the right side radar device 1R.

Then, in the processes at step S18 and beyond, the synthetic aperture processing section 33 conducts the synthetic aperture processing by using the reception signal SR and the position PR (or the movement amount Δd) stored in the information storing section 34. It should be noted that, the synthetic aperture processing section 33 may conduct the synthetic aperture processing by taking into consideration of the time interval at which the radar signal processing section 31 acquires the reception signal SR(k) from the right side radar device 1R.

At step S18 in FIG. 5, the synthetic aperture processing section 33 determines whether or not M number or more of the reception signals SR are stored in the information storing section 34. Specifically, in the processes at step S18 and beyond, the synthetic aperture processing section 33 conducts the synthetic aperture processing by using multiple pieces of data (reception signals SR and positions PR (or movement amounts Δd) corresponding to the reception signals SR) stored in the information storing section 34. In other words, in the process at step S18, the synthetic aperture processing section 33 determines whether enough pieces of data for allowing the synthetic aperture processing section 33 to conduct the synthetic aperture processing are stored in the predetermined information storing section 34. It should be noted that, as for the number described above, a reception signal SR(k) is counted as one.

Then, in the process at step S18, when a positive determination is made (YES), that is, when it is determined that M number or more of the reception signals SR are stored in the information storing section 34, the synthetic aperture processing section 33 advances the process to step S19 which is next. On the other hand, when a negative determination is made (YES), that is, when it is determined that M number or more of the reception signals SR are not stored in the information storing section 34, the synthetic aperture processing section 33 returns the process to the above described step S11.

At step S19, which is subsequent to step S18 where a positive determination is made, the synthetic aperture processing section 33 conducts the synthetic aperture processing by using N number of reception signals SR among the reception signals SR stored in the information storing section 34. Here, by using FIG. 6, a process conducted by the synthetic aperture processing section 33 at step S19 is described. Furthermore, in the following description, the number of the reception signals SR used for the synthetic aperture processing is three (N=3). It should be noted that, when the pieces of data used in the synthetic aperture processing is three (N=3), since it is necessary to have three of more pieces of the data stored in the information storing section 34 at step S18 described above, a configuration of M≥3 is required. Additionally, although it will be obvious from the descriptions below, when an envisioned case is one in which the process is conducted by having L number of the reception signals SR being added to the N number for the usage in the synthetic aperture processing, a configuration of M≥(N+L) may be used.

Figure 6:
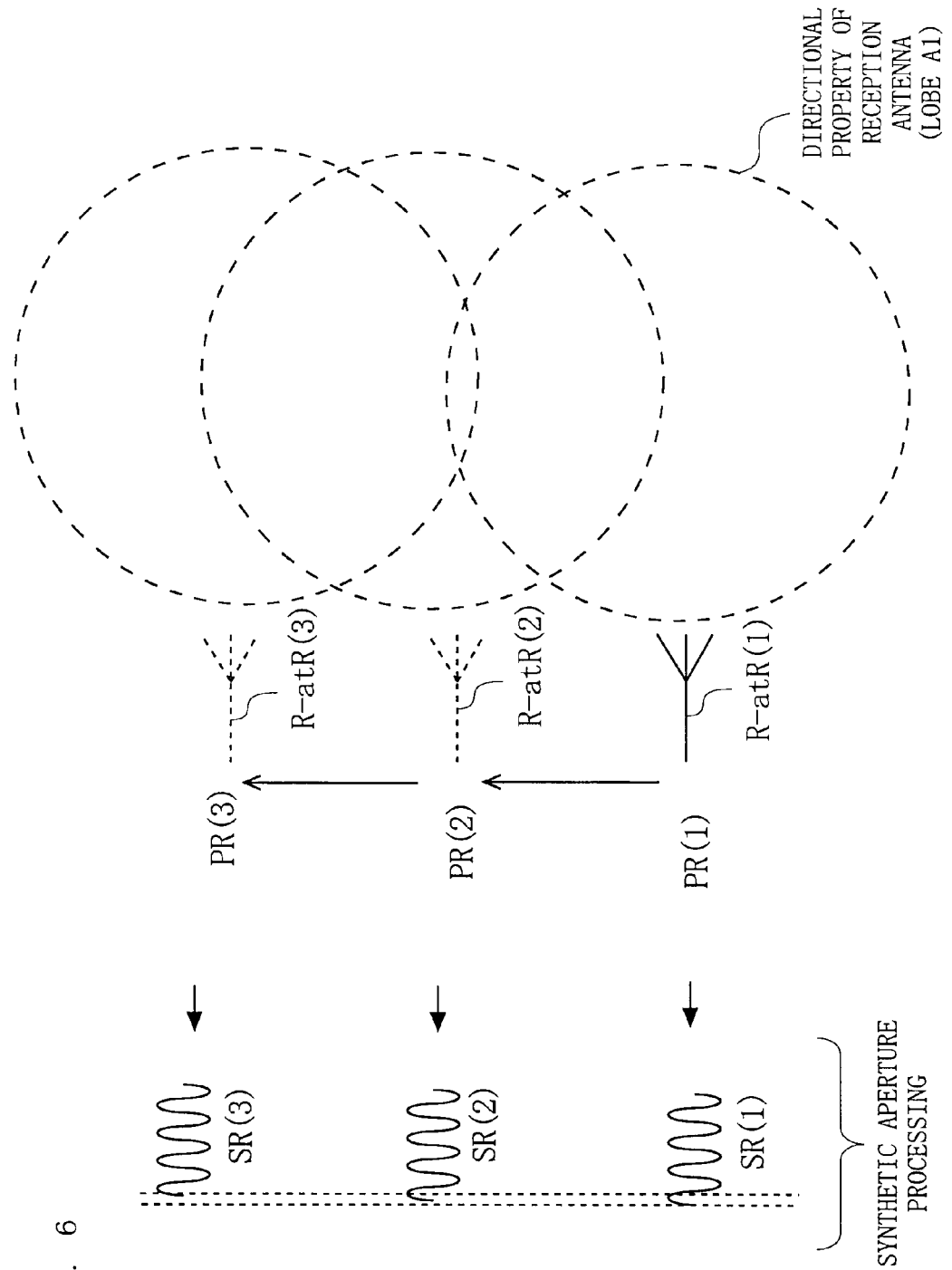
FIG. 6 is a figure for describing one example of a synthetic aperture processing.

As shown in FIG. 6, for example, envisioned is a case where the processes in the flowchart are initiated, and the sections of the radar ECU 3 acquire the reception signal SR(1) from the reception antenna R-atR(1) for the first time. In addition, the reception antenna R-atR(1) moves to the reception antenna R-atR(2) and to the reception antenna R-atR(3) as shown in FIG. 6, associated with the movement of the own-vehicle mv. Here, as described above, since N=3 is used as one example, a case is used as an example for the description where the synthetic aperture processing section 33 conducts the synthetic aperture processing on the reception signal SR(1), the reception signal SR(2), and reception signal (3). Thus, the synthetic aperture processing section 33 conducts an aperture synthesis on the reception signals SR obtained between the position PR(1) and the position PR(3) from the reception antenna R-atR. It should be noted that, the reception signals SR (for example, data indicating amplitude and phase) received between the position PR(1) and the position PR(3) from the reception antenna R-atR are stored at respective positions. Therefore, the synthetic aperture processing section 33 may conduct the synthetic aperture processing based on the reception signals SR stored in the information storing section 34 and the positions PR corresponding to the reception signals SR.

It should be noted that, the synthetic aperture processing section 33 may conduct the synthetic aperture processing of the reception signals SR, by taking into consideration of the time interval that is calculated by the vehicle information processing section 32 for the obtained reception signals SR. Specifically, based on the time interval from when the reception signal SR(1) is obtained to when the reception signal SR(2) is obtained, and based on the time interval from when the reception signal SR(2) is obtained to when the reception signal SR(3) is obtained; for example, the synthetic aperture processing section 33 may conduct the synthetic aperture processing on the reception signal SR(1) and the reception signal SR(3) after adjusting their time to a time received at the position PR(2). Generally, the radar device irradiates the periphery of the own-vehicle mv with electromagnetic waves, and detects an object by measuring reflected waves which return back as the reflected waves. At the same time, generally, since the cases are not limited to one in which the own-vehicle mv is traveling straight ahead, the arrival of the reception signal SR received by the reception antenna may be delayed depending on the position. Therefore, in the synthetic aperture processing, by taking into consideration of the time interval of the obtained reception signals SR, the synthetic aperture processing section 33 can conduct the synthetic aperture processing on the reception signals SR more precisely.

Furthermore, generally, since the cases are not limited to one in which the own-vehicle mv is traveling straight ahead, it is also conceivable that the direction of the own-vehicle mv (direction of the reception antenna R-atR) can change at each of the positions PR, resulting from, for example, a steering operation performed by the driver of the own-vehicle mv. Therefore, the synthetic aperture processing section 33 may conduct the synthetic aperture processing on the reception signals, based on information indicating the own-vehicle's mv direction at which each of the reception signals SR calculated by the vehicle information processing section 32 using the vehicle information imv is obtained, and on the positions where the reception signals are obtained. Specifically, the vehicle information processing section 32 may calculate the directions of the own-vehicle mv at time points where the reception signals SR are respectively obtained, by using, for example, a steering angle or a yaw rate of the own-vehicle mv, a roll sensor, a pitch sensor, a three axis G-sensor, and the like included in the vehicle information imv.

Figure 7:
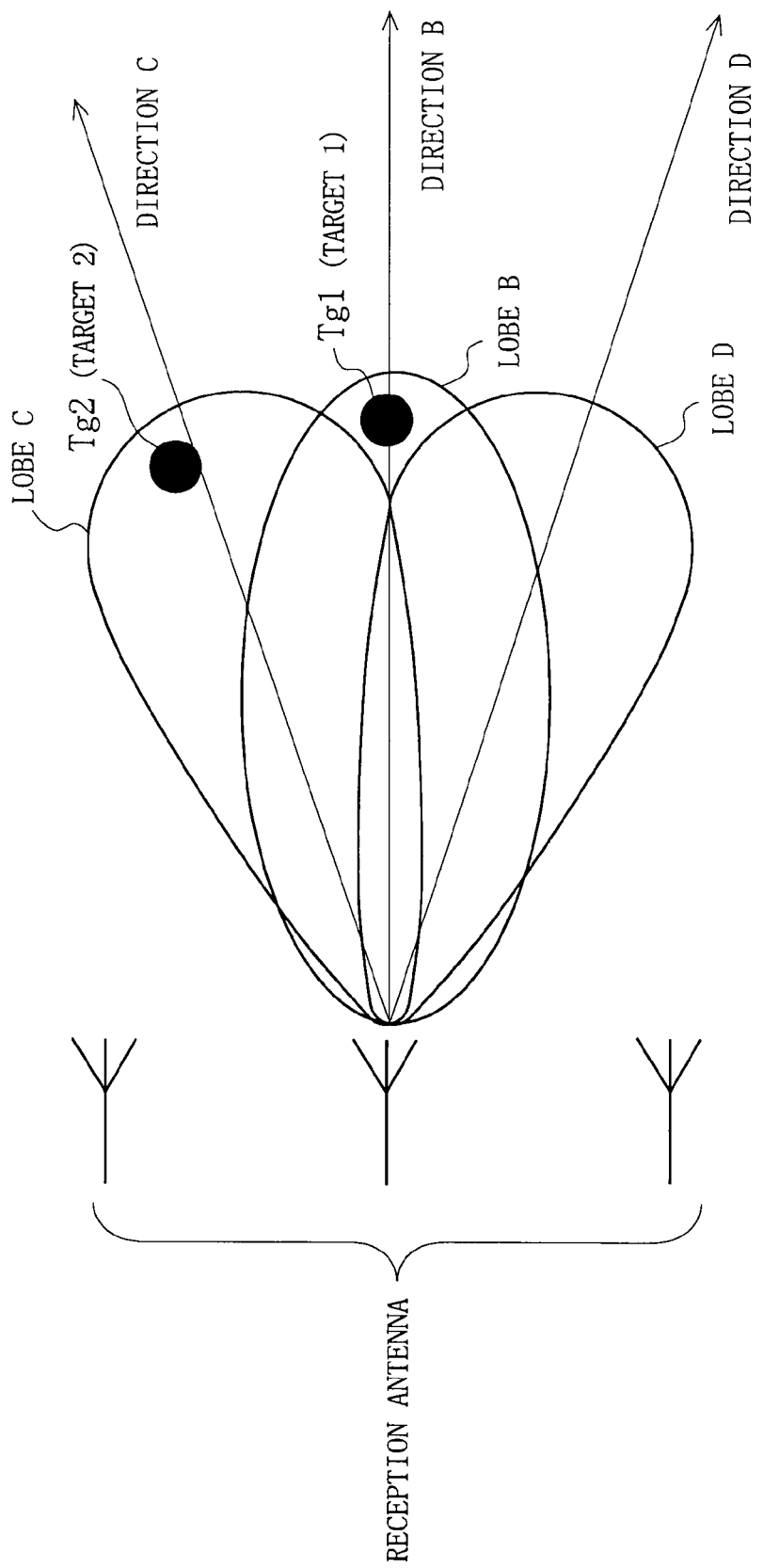
FIG. 7 is a figure showing a result of the synthetic aperture processing that uses a reception signal SR(1), a reception signal (2), and a reception signal (3).

FIG. 7 is a figure showing a result of conducting the synthetic aperture processing by using the reception signal SR(1), the reception signal (2), and the reception signal (3).

As shown in FIG. 7, by conducting the synthetic aperture processing with a radar including a single reception antenna, the radar can function as if it includes three reception antennae.

Describing more specifically, for example, a directional pattern such as lobe B can be obtained by conducting the synthetic aperture processing in direction B in FIG. 7 (forward direction of the reception antenna). Additionally, for example, directional patterns such as lobe C and lobe D can be obtained by conducting the synthetic aperture processing in direction C and direction D in FIG. 7 (left and right directions with regard to the forward direction of reception antenna). Therefore, all the directional patterns of lobe B, lobe C, and lobe D are narrower when compared to the directional pattern (lobe A) shown in FIG. 6. As a result, a target Tg1 and a target Tg2 shown in FIG. 7 can be separately detected. In other words, by having a narrower directional property for the reception antenna, the target Tg1 and the target Tg2, which could not be separated with the directional property with a single reception antenna (when the synthetic aperture processing is conducted), can be separately detected.

Returning to the description of the flowchart in FIG. 5, at step S20 in FIG. 5, the synthetic aperture processing section 33 determines whether or not the resolution is appropriate. It should be noted that, in the process at step S20, a positive determination is made when the resolution is appropriate. In this case, when a positive determination is made (YES), the synthetic aperture processing section 33 advances the process to step S21. On the other hand, when the resolution is not appropriate and when a negative determination is made, the synthetic aperture processing section 33 advances the process to step S22.

It should be noted that, the case in which a negative determination is made in the process at step S20 is a case in which a desired resolution is not obtained, and at the next step S22, the synthetic aperture processing section 33 adds L to N, and conducts the process at step S19 once again. It should be noted that, the value of L is an arbitrary integer (1, 2, 3, . . . ).

Here, the specific process conducted by the synthetic aperture processing section 33 at step S20 described above will be described. Generally, for a synthetic aperture processing, the resolution in the azimuth direction becomes higher as the number of the reception signals SR used in the synthetic aperture processing becomes higher. Therefore, at step S19, although three is used as one example of the number of the reception signals SR used in the synthetic aperture processing, a directional pattern narrower than, for example, lobe B can be obtained by using a larger N value at step S16 (the same can be said for lobe C and lobe D).

For example, in a first example of a method of determining whether or not the resolution is appropriate, the synthetic aperture processing section 33 first calculates a distance from the right side radar device 1R to a target and the azimuth of the target with regard to the right side radar device 1R, by analyzing the reception signals SR(1) to SR(3) and the transmission signals. Then, the synthetic aperture processing section 33 calculates an angular difference of azimuth directions of a plurality of reflecting points at approximately identical distances (for example, B direction (forward direction of the reception antenna) in FIG. 7)). On the other hand, since the number the pieces of data used for the synthetic aperture processing is generally in a proportional relationship with the resolution of the azimuth direction, for example, a minimum azimuth difference, at which two different targets in the same distance from the right side radar device 1R can be identified (theoretical resolution), can be calculated in advance. As a result, the synthetic aperture processing section 33 can determine whether or not the resolution is appropriate.

Furthermore, for example, in a second example of the method of determining whether or not the resolution is appropriate, the synthetic aperture processing section 33 analyzes the reception signals SR(1) to SR(3) and the transmission signals and uses the intensities (sharpness of peaks) of reflected waves as indices to determine whether or not the resolution is appropriate, therefore, whether or not a desired resolution is obtained can also be determined. For example, as a result of analyzing the reception signals SR(1) to SR(3) and the transmission signals, if the intensities (sharpness of peaks) of the obtained reflected waves result in a blunt or smooth intensity distribution (if a slope of the intensity distribution of the reflected waves is gentle) when compared to a desired peak sharpness, the synthetic aperture processing section 33 can determine that the resolution is not appropriate.

Then, at step S21, the synthetic aperture processing section 33 outputs, to the vehicle control ECU 4, the distance from the right side radar device 1R to the target and the azimuth of the target with regard to the right side radar device 1R; and advances the process to the next step S23.

At step S20 in FIG. 5 described above, the synthetic aperture processing section 33 determines whether or not the resolution is appropriate, and, when a desired resolution is not obtained, uses a method of increasing the number of the pieces of data (that is, the number of the reception signals) used in the synthetic aperture processing. However, as the method of determining whether or not the resolution is appropriate, a third example described in the following may also be used.

When compared to a satellite or an aircraft, generally a vehicle (for example, the own-vehicle mv) is not often in a linear uniform motion since, for example, the driver is constantly performing steering operations. Furthermore, on the other hand, it is necessary for the synthetic aperture processing to precisely obtain the position where the own-vehicle mv has received reflected waves. In other words, if a position where the own-vehicle mv receives the reflected waves shifts, to a different position, from a position where the reflected waves would have been originally obtained, and if the synthetic aperture processing is conducted, there may be cases where the desired resolution cannot be obtained.

In this case, the third example can also be used by the synthetic aperture processing section 33 as the method for determining whether or not the resolution is appropriate. In the following, by using FIG. 8, the third example of the method, which is conducted by the synthetic aperture processing section 33 for determining whether or not the resolution is appropriate, will be described.

FIG. 8 is a figure showing one example of a trajectory of the own-vehicle mv. As shown in FIG. 8, for example, when the vehicle information processing section 32 calculates, by using point a' as a basis, positions of point b', point c', and point d' based on the vehicle information imv obtained from the vehicle information detecting section 2; the trajectory of the own-vehicle mv can be represented as the dashed line shown in FIG. 8. By using the trajectory of the own-vehicle mv shown as the dashed line in FIG. 8 as a basis, the synthetic aperture processing section 33 hypothesizes several randomly generated trajectories by using, for example, Monte Carlo methods. Then, assuming that the own-vehicle mv has traveled in the randomly generated trajectories, the synthetic aperture processing section 33 conducts the synthetic aperture processing on the reception signals obtained at respective positions of the position of point a', the position of point b', the position of point c', and the position of point d'; and uses a trajectory having the largest intensities (sharpness of peaks) of the reflected waves as the true trajectory (in FIG. 8, simply referred to as a trajectory). Therefore, the synthetic aperture processing section 33 adopts the position of point a', the position of point b, the position of point c, and the position of point d shown in FIG. 8 as the respective positions used for the synthetic aperture processing; and outputs the result to the vehicle control ECU 4.

In the first method and the second method described above, the synthetic aperture processing section 33 advances the process to step S22 when a negative determination is made at step S20. However, in the third method described above, the synthetic aperture processing section 33 may advance the process to step S22 and increase the number of reception signals used in the synthetic aperture processing, or may advance the process to step S21. Furthermore, the synthetic aperture processing section 33 may use one of the first to third methods alone, or may use a plurality of those.

At step S23, the synthetic aperture processing section 33 determines whether or not to end the processes. For example, when the power of the radar ECU 3 is turned OFF (for example, when the ignition switch of the own-vehicle mv is turned OFF, and the like), the synthetic aperture processing section 33 ends the processes in the flowchart shown in FIG. 5. On the other hand, when the synthetic aperture processing section 33 determines to continue the processes, the process is returned to step S11 described above and the processes are repeated.

Figure 9:
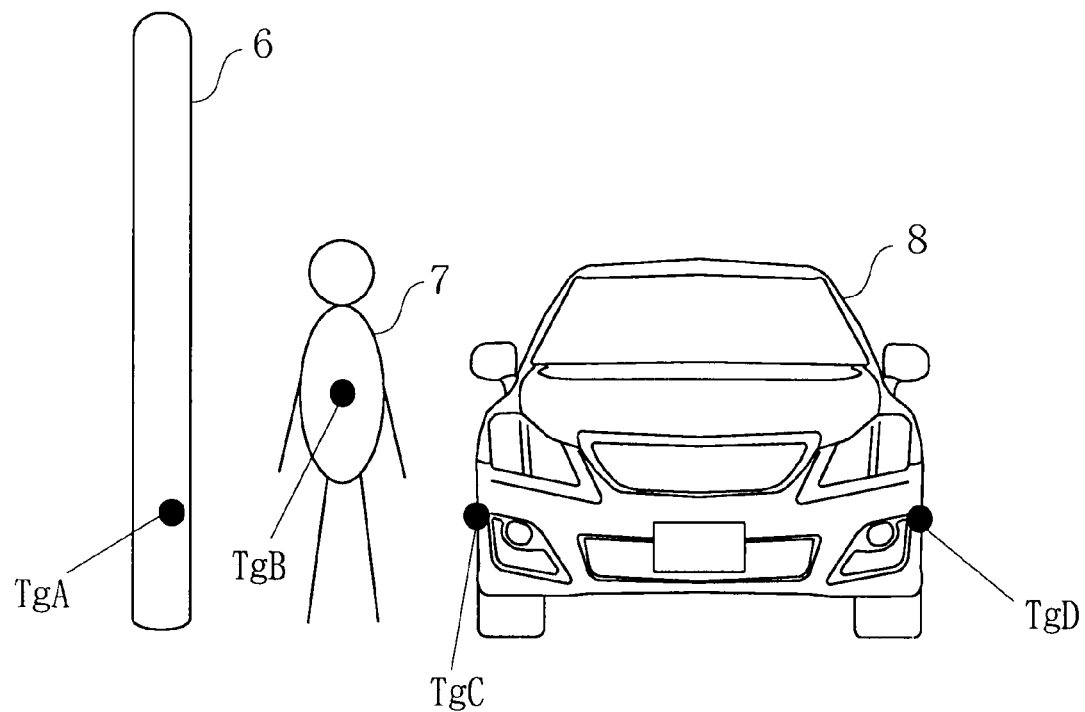
FIG. 9 is a figure showing one example of a peripheral environment of the own-vehicle mv.

As described above, according to the present embodiment, a high resolution that cannot be obtained by a common vehicle-mounted radar device can be obtained for the azimuth direction. Here, a specific description will be provided by using FIG. 9. FIG. 9 is a figure showing one example of a peripheral environment of the own-vehicle mv. As shown in FIG. 9 as an example, existing in the periphery of the own-vehicle mv are a telephone pole 6, a pedestrian 7, and another-vehicle 8 that is parked. In such a situation, it is difficult to separately detect, for example, a target TgA, a target TgB, and a target TgC in FIG. 9 with the directional property of a single reception antenna if the synthetic aperture processing is not conducted; and it has been difficult to recognize the existence of three objects such as the telephone pole 6, the pedestrian 7, and the other-vehicle 8 in the periphery of the own-vehicle mv. However, as a result of having a narrow directional property by conducting the synthetic aperture processing in a situation as shown in FIG. 9, the vehicle-mounted radar device according to the present embodiment can separately detect the target TgA and the target TgB. Furthermore, by increasing the number (specifically, the value of N in step S19 described above) of the reception signals SR used in the synthetic aperture processing, the vehicle-mounted radar device according to the present embodiment can detect a right corner portion and a left corner portion of the single other-vehicle 8 as the target TgC and TgD shown in FIG. 9. As a result, object size (for example the vehicle width of the other-vehicle 8 shown in FIG. 9) that could not be obtained with a general vehicle-mounted radar device can be detected. It should be noted that, the value of N may be configured in advance in consideration of the target that is desired to be separately detected.

Figure 11:
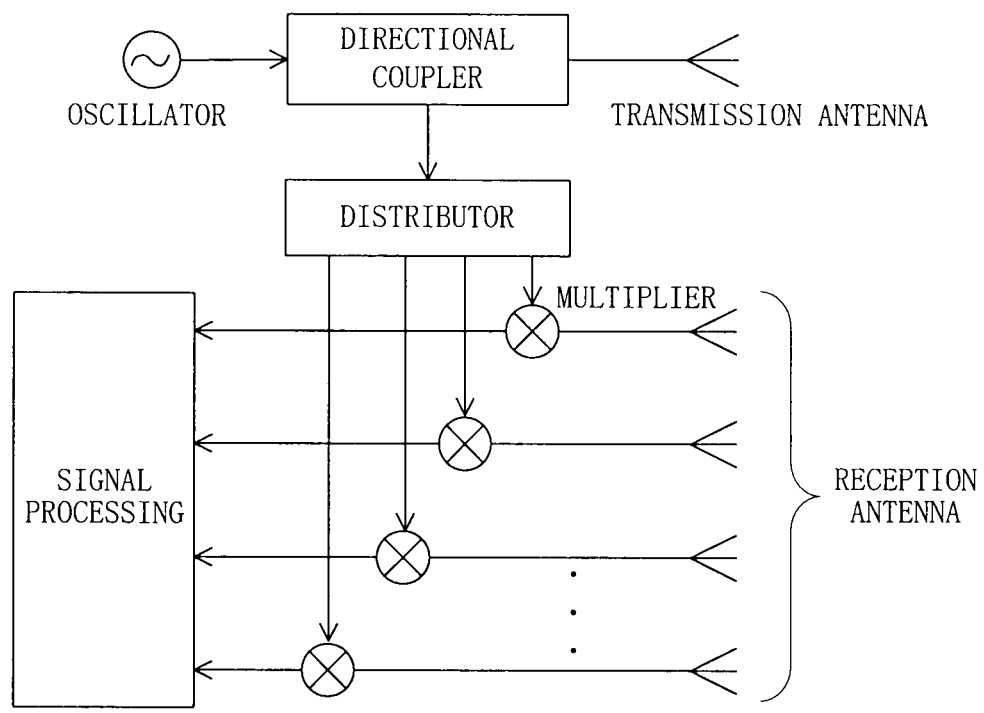
FIG. 11 is a figure showing one example of a configuration of a radar device having a plurality of reception systems.

It should be noted that, in the examples described above, in order to simplify the description, the description is provided supposing that the right side radar device 1R includes a single reception antenna. More specifically, the description has been provided supposing the right side radar device 1R (the left side radar device 1L) has a configuration as shown in FIG. 10. As described above, the vehicle-mounted radar device according to the present embodiment enhances the resolution in the azimuth direction by using the movement of the radar devices 1 mount on the own-vehicle mv. In a general vehicle-mounted radar device, in order to achieve a resolution of the azimuth direction as high as possible from a vehicle-mounted radar device alone, a plurality of reception antennae are included as shown in FIG. 11, and the resolution of the azimuth direction is enhanced by using signal processing such as DBF, MUSIC, and the like. However, the vehicle-mounted radar device according to the present embodiment can enhance the resolution of the azimuth direction even with a simple configuration with, for example, a single reception antenna as shown in FIG. 10. Therefore, when compared to the general vehicle-mounted radar device, the circuit configuration can be simplified, the cost can be reduced, and reduction in size can also be achieved.

Described above are examples of an envisioned case in which the right side radar device 1R acquires the reception signal SR from the radar signal processing section 31, and the sections of the radar ECU 3 conduct the synthetic aperture processing by using the reception signal SR. However, it is needless to say that the left side radar device 1L can acquire the reception signal SL from the radar signal processing section 31, and the sections of the radar ECU 3 can conduct the synthetic aperture processing by using the reception signal SL. It should be noted that, a description of the mode in which the radar ECU 3 conducts the synthetic aperture processing by using the sections of the reception signal SL is omitted, since it can be analogically understood and adapted from the description provided above.

Furthermore, described using FIG. 2 is a mode in which the right side radar device 1R and the left side radar device 1L are installed in predetermined positions on the front portion of the own-vehicle mv (for example, a position where a head light, a directional indicator, and the like of the right (left) front portion of the own-vehicle mv is mounted), electromagnetic waves are radiated toward the outer side of the own-vehicle mv, and the periphery in front of the own-vehicle mv is monitored. However, a mode may be used in which the right side radar device 1R and the left side radar device 1L are installed in predetermined positions on the rear portion of the own-vehicle mv (for example, a position where a head light, a directional indicator, and the like of the right (left) rear portion of the own-vehicle mv is mounted), electromagnetic waves are radiated toward the outer side of the own-vehicle mv, and the periphery behind the own-vehicle mv is monitored.

Figure 12:
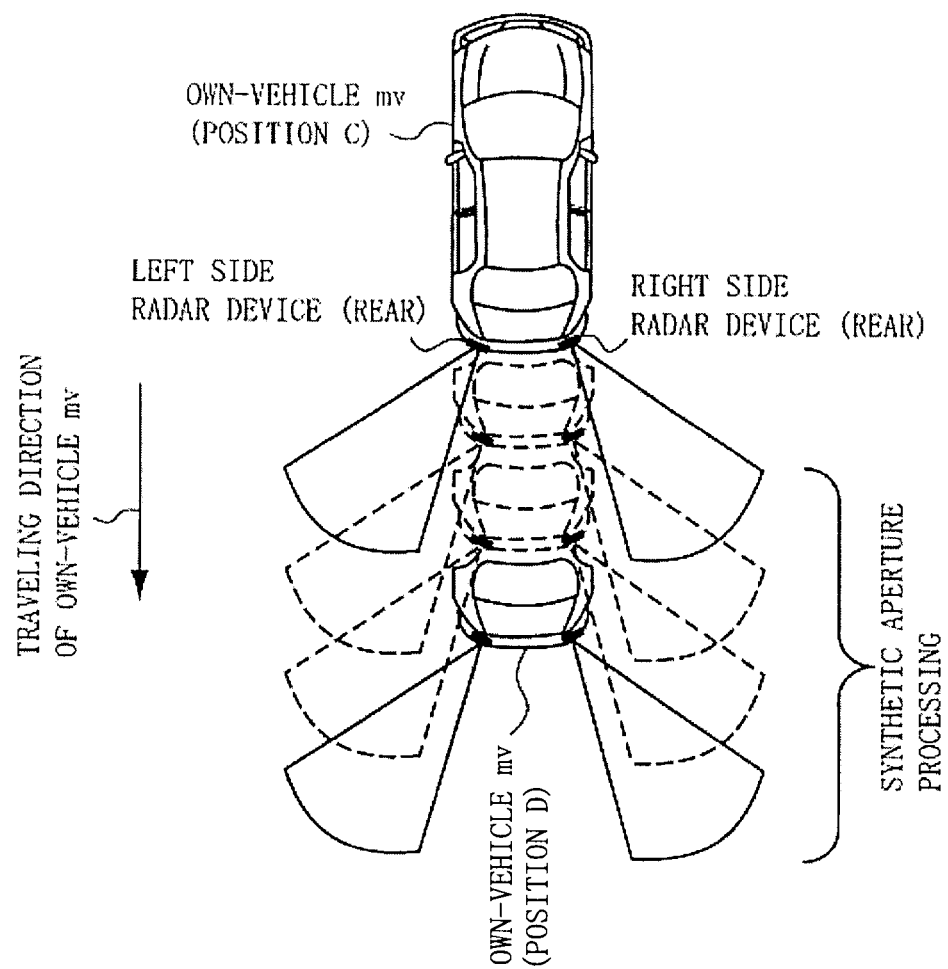
FIG. 12 is a figure showing one example of rear mount positions of radar devices 1.

For example, as shown in FIG. 12, when the own-vehicle mv is travelling from position C to position D in an arrow direction (traveling direction of the own-vehicle mv) shown in FIG. 12, for example, by synthesizing (synthetic aperture processing) reception signals received by (rear) radar devices 1 while moving from position C to position D, properties equivalent to that obtained if receptions are conducted with radar devices 1 having a large aperture area (antenna) can be achieved.

While the invention has been described in detail, the foregoing description is in all aspects illustrative and not restrictive. It is understood that numerous other modifications and variations can be devised without departing from the scope of the invention.

INDUSTRIAL APPLICABILITY

A vehicle-mounted radar device according to the present invention is usefully used as a vehicle-mounted radar device that is mounted on a vehicle and detects an object approaching the periphery of the vehicle, and that is capable of obtaining a high azimuth resolution with a simple configuration.

DESCRIPTION OF THE REFERENCE CHARACTERS

1R . . . right side radar device
1L . . . left side radar device
2 . . . vehicle information detecting section
31 . . . radar signal processing section
32 . . . vehicle information processing section
33 . . . aperture synthesis processing section
34 . . . information storing section
4 . . . vehicle control ECU
5 . . . safety device
6 . . . telephone pole
7 . . . pedestrian
8 . . . other-vehicle

The invention claimed is:

1. A radar device mounted on a vehicle, the radar device comprising:
   a radar processing unit for radiating electromagnetic waves, and for outputting a reception signal obtained from reflected waves that are reflected from an object that exists in a periphery of the vehicle;
   a vehicle information calculator for calculating information related to a movement of the vehicle with a use of vehicle information related to a traveling state of the vehicle;
   a storage unit for storing a plurality of the reception signals outputted by the radar processing unit at a plurality of positions of the vehicle, respectively, which change according to the movement of the vehicle; and
   a synthetic aperture processor for conducting a synthetic aperture processing on the plurality of the reception signals obtained at the plurality of positions, respectively, which change according to the movement of the vehicle, based on the information related to the movement of the vehicle, wherein
   the vehicle information calculator calculates, with a use of the vehicle, information indicating positions where the plurality of the reception signals are respectively obtained, as the information related to the movement of the vehicle, and the vehicle information calculator further calculates a time interval between a time point of obtainment of a preceding reception signal and a time point of obtainment of a current reception signal, based on time information obtained for the reception signals,
   the storage unit stores, for each of the plurality of the reception signals, the reception signal together with the time interval between the time point of obtainment of the preceding reception signal and the time point of obtainment of the current reception signal and the information indicating the positions where the reception signal is obtained, and
   the synthetic aperture processor conducts synthetic aperture processing on the reception signals, based on the plurality of the positions where the plurality of the reception signals are obtained and on the time interval between the time point of obtainment of the preceding reception signal and the time point of obtainment of the current reception signal obtained at the plurality of positions.

2. The radar device according to claim 1, wherein:
   the vehicle information calculator further calculates, with a use of the vehicle information, information indicating directions of the vehicles at times when the plurality of the reception signals are respectively obtained;

the storage unit stores, for each of the plurality of the reception signals, the reception signals together with the information indicating the directions of the vehicle at a time when the reception signal is obtained; and the synthetic aperture processor conducts the synthetic aperture processing on the reception signals, based on the plurality of positions where the reception signals are obtained and on a plurality of directions to which the electromagnetic waves are radiated and which are obtained from the directions of the vehicle at times when the plurality of the reception signals are obtained.

3. The radar device according to claim 1, wherein the synthetic aperture processor conducts the synthetic aperture processing by using only a predetermined number of the reception signals stored in the storage unit.

4. The radar device according to claim 1, wherein the synthetic aperture processor, in accordance with a predetermined condition, increases or decreases the number of the reception signals used in the synthetic aperture processing.

5. The radar device according to claim 1, wherein the synthetic aperture processor, by conducting the synthetic aperture processing, further conducts a process that detects the object in the periphery of the vehicle.

6. The radar device according to claim 1, wherein the radar processing unit is mounted on at least one a front and a back of the vehicle.

7. The radar device according to claim 1, further comprising a determination unit for determining a risk of a contact between the vehicle and an object detected by the synthetic aperture processor.

8. The radar device according to claim 1, wherein
the radar processing unit includes one transmission antenna and one reception antenna.

9. A radar device mounted on a vehicle, the radar device comprising:
a radar processing unit for radiating electromagnetic waves, and for outputting a reception signal obtained from reflected waves that are reflected from an object that exists in a periphery of the vehicle;
a vehicle information calculator for calculating information related to a movement of the vehicle with a use of vehicle information related to a traveling state of the vehicle;
a storage unit for storing a plurality of the reception signals outputted by the radar processing unit at a plurality of positions of the vehicle, respectively, which change according to the movement of the vehicle; and
a synthetic aperture processor for conducting a synthetic aperture processing on the plurality of the reception signals obtained at the plurality of positions, respectively, which change according to the movement of the vehicle, based on the information related to the movement of the vehicle, wherein
the vehicle information calculator calculates, with a use of the vehicle information, information indicating a trajectory in which the vehicle has moved, as the information related to the movement of the vehicle,
the storage unit stores, as a first trajectory, the information indicating the trajectory in which the vehicle has moved, together with the plurality of the reception signals, and
the synthetic aperture processor calculates a second trajectory from the first trajectory and the plurality of the reception signals, and conducts the synthetic aperture processing on the plurality of the reception signals under an assumption that the plurality of the reception signals are respectively obtained at positions on the second trajectory.

10. The radar device according to claim 9, wherein the synthetic aperture processor conducts the synthetic aperture processing by using only a predetermined number of the reception signals stored in the storage unit.

11. The radar device according to claim 9, wherein the synthetic aperture processor, in accordance with a predetermined condition, increases or decreases the number of the reception signals used in the synthetic aperture processing.

12. The radar device according to claim 9, wherein the synthetic aperture processor, by conducting the synthetic aperture processing, further conducts a process that detects the object in the periphery of the vehicle.

13. The radar device according to claim 9, wherein the radar processing unit is mounted on at least one a front and a back of the vehicle.

14. The radar device according to claim 9, further comprising a determination unit for determining a risk of a contact between the vehicle and an object detected by the synthetic aperture processor.

15. The radar device according to claim 9, wherein
the radar processing unit includes one transmission antenna and one reception antenna.

* * * * *